US012743898B2

(12) United States Patent
El Bakry et al.

(10) Patent No.: US 12,743,898 B2
(45) Date of Patent: Sep. 22, 2026

(54) SYSTEMS AND METHODS UTILIZING MACHINE VISION AND THREE-DIMENSIONAL MODELING TECHNIQUES FOR SURFACE MATCHING

(71) Applicant: ZEBRA TECHNOLOGIES CORPORATION, Lincolnshire, IL (US)

(72) Inventors: Ola El Bakry, Dollard-des-Ormeaux (CA); Jean-Sébastien Lemieux, Montreal (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 206 days.

(21) Appl. No.: 18/393,332

(22) Filed: Dec. 21, 2023

(65) Prior Publication Data

US 2024/0290114 A1 Aug. 29, 2024

Related U.S. Application Data

(60) Provisional application No. 63/447,788, filed on Feb. 23, 2023, provisional application No. 63/447,786, filed on Feb. 23, 2023.

(51) Int. Cl.
*G06V 20/64* (2022.01)
*G06T 7/00* (2017.01)

(52) U.S. Cl.
CPC ............ *G06V 20/653* (2022.01); *G06T 7/001* (2013.01); *G06T 2207/10028* (2013.01); *G06T 2207/20072* (2013.01); *G06T 2207/30108* (2013.01)

(58) Field of Classification Search
CPC .................. G06V 20/653; G06T 7/001; G06T 2207/10028; G06T 2207/20072; G06T 2207/30108; G06T 2207/10021; G06T 2207/10024; G06T 2207/30164; G06T 7/0004; G06T 7/75
See application file for complete search history.

(56) References Cited

U.S. PATENT DOCUMENTS

2011/0273442 A1* 11/2011 Drost .................. G06V 10/757
345/419
2021/0073571 A1* 3/2021 Bergen .................. G06V 20/64
2021/0350165 A1* 11/2021 Zhu ......................... G06F 18/22
2022/0343518 A1* 10/2022 Finley ....................... G06T 5/50

* cited by examiner

*Primary Examiner* — Wassim Mahrouka

(57) ABSTRACT

Systems and methods utilizing machine vision and three-dimensional (3D) modeling techniques for surface matching are disclosed herein. The method obtains, by a 3D camera, a 3D image including one or more occurrence candidates of one or more objects present in a scene and ranks, via a processor, the one or more occurrence candidates. The method determines, based on a first metric, a set of occurrence candidates from the ranked one or more occurrence candidates, and groups occurrence candidates of the determined set of occurrence candidates based on at least one attribute of each occurrence candidate. The method determines a confidence level of each group of occurrence candidates based on a number of occurrence candidates in each group and selects, based on a second metric, an occurrence candidate having a highest second metric value from each group of occurrence candidates. The method performs matching of the selected occurrence candidates with a surface of a 3D model.

22 Claims, 9 Drawing Sheets

Score = 96%, 0.13 Seconds

RMSE = 0.3, 0.2 Seconds

SYSTEMS AND METHODS UTILIZING MACHINE VISION AND THREE-DIMENSIONAL MODELING TECHNIQUES FOR SURFACE MATCHING

CROSS-REFERENCE TO RELATED APPLICATIONS

This application claims priority to U.S. Provisional Patent Application Ser. Nos. 63/447,788 and 63/447,786, filed on Feb. 23, 2023, and incorporated herein by reference in their entirety.

BACKGROUND

Machine vision technologies provide a means for image-based inspection and analysis for applications ranging from automatic part inspection, process control, robotic guidance, part identification, barcode reading, and many others. Machine vision technologies rely on capturing and processing images for performing specific analysis or tasks which often require both the integrated use of imaging systems as well as processing systems. Industrial machine vision (IMV) may be useful for monitoring and classifying inventory in a warehouse, along a production line, or at a receiving bay. Therefore, a means for identifying parts and products for IMV is necessary. Surface matching systems may utilize machine vision processes for different surfaces and/or corresponding objects belonging thereto, performing fabrication evaluations, etc. For example, surface matching systems may utilize machine vision processes to identify three-dimensional (3D) objects in a scene similar in shape to a predefined 3D model. In various applications (e.g., industrial, commercial, etc.), surface matching requires execution in real-time where the surface matching is precise for a known product (e.g., surface matching results should be consistent and reliable).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
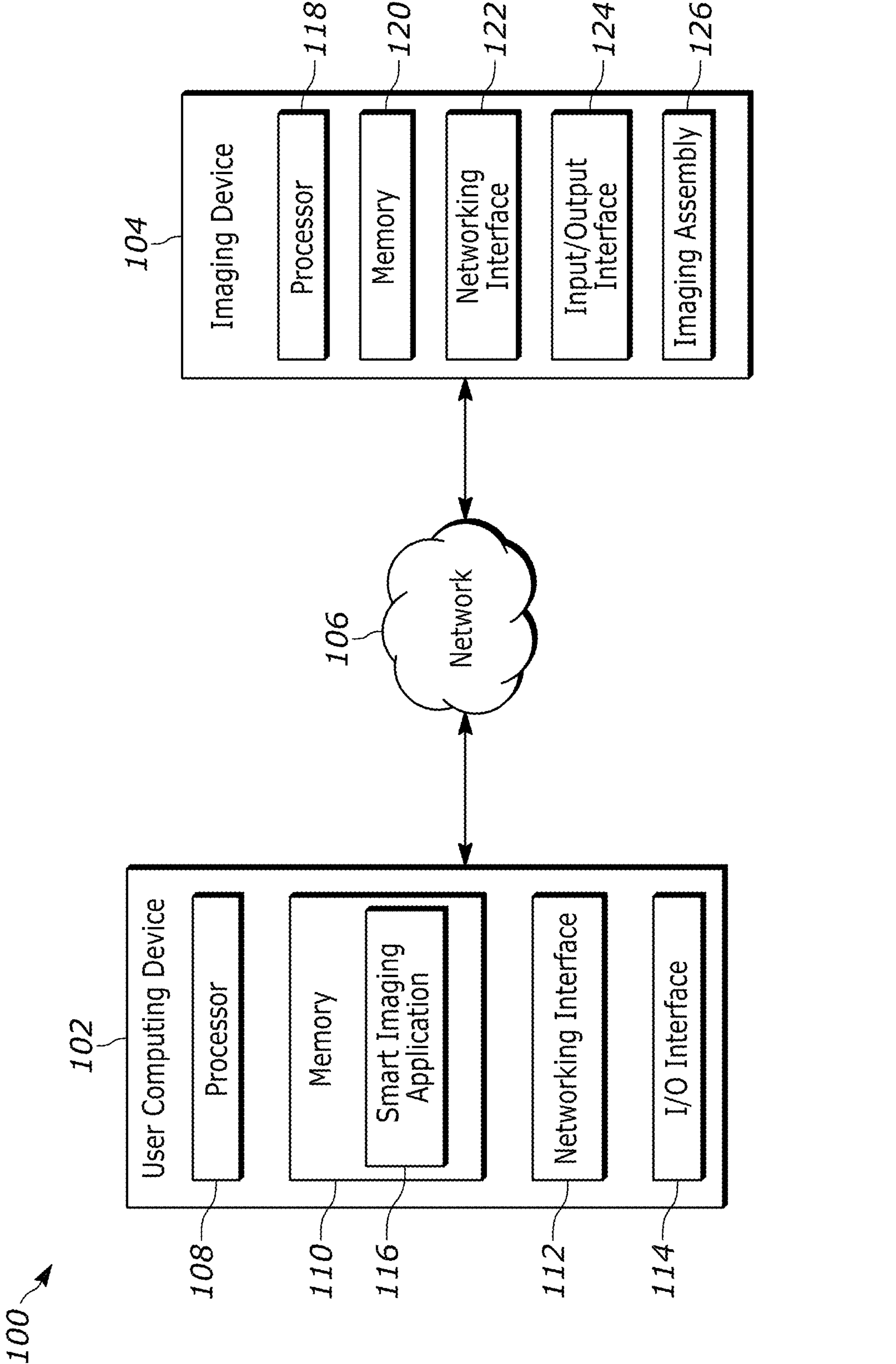
FIG. 1 illustrates an example imaging system configured to analyze an image of a target object to execute a machine vision job, and more specifically, a surface matching job in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method. The method comprises obtaining, by a three-dimensional (3D) camera, a 3D image of a field of view of the 3D camera, the 3D image including one or more occurrence candidates of one or more objects present in a scene; ranking, via a processor, the one or more occurrence candidates; determining, via the processor and based on a first metric, a set of occurrence candidates from the ranked one or more occurrence candidates; grouping, via the processor, occurrence candidates of the determined set of occurrence candidates based on at least one attribute of each occurrence candidate; determining, via the processor, a confidence level of each group of occurrence candidates based on a number of occurrence candidates in each group; selecting, via the processor and based on a second metric, an occurrence candidate having a highest second metric value from each group of occurrence candidates; and performing, via the processor, matching of the selected occurrence candidates with a surface of a 3D model.

Additional examples disclosed herein are directed to a system. The system comprises a three-dimensional (3D) imager configured to capture and provide 3D images of a field of view of the 3D imager, the 3D images including one or more occurrence candidates of one or more objects present in a scene; and a processor and computer-readable media storage having machine readable instructions stored thereon. The machine readable instructions, when executed, cause the system to: obtain a first 3D image of the field of view of the 3D imager; rank the one or more occurrence candidates; determine, based on a first metric, a set of occurrence candidates from the ranked one or more occurrence candidates; group occurrence candidates of the determined set of occurrence candidates based on at least one attribute of each occurrence candidate; determine a confidence level of each group of occurrence candidates based on a number of occurrence candidates in each group; select, based on a second metric, an occurrence candidate having a highest second metric value from each group of occurrence candidates; and perform matching of the selected occurrence candidates with a surface of a 3D model.

Additional examples disclosed herein are directed to a one or more tangible non-transitory computer-readable media storing computer-executable instructions. The computer-executable instructions, when executed via one or more processors, cause one or more imaging systems to: obtain, via a three-dimensional (3D) camera, a 3D image of a field of view of the 3D camera, the 3D image including one or more occurrence candidates of one or more objects present in a scene; rank, via a processor, the one or more occurrence candidates; determine, via the processor and based on a first metric, a set of occurrence candidates from the ranked one or more occurrence candidates; group, via the processor, occurrence candidates of the determined set of occurrence candidates based on at least one attribute of each occurrence candidate; determine, via the processor, a confidence level of each group of occurrence candidates based on a number of occurrence candidates in each group; select, via the processor and based on a second metric, an occurrence candidate having a highest second metric value from each group of occurrence candidates; and perform, via the processor, matching of the selected occurrence candidates with a surface of a 3D model.

As mentioned above, surface matching systems may utilize machine vision processes for identifying different surfaces and/or objects belonging thereto, performing fabrication evaluations, etc. based on three-dimensional (3D) information obtained via images or point clouds. For example, surface matching systems may utilize machine vision processes to identify 3D objects in a scene similar in shape to a predefined 3D model. Typically, these systems use geometric information or shapes of objects in an image to match the object surface to geometric patterns or properties of a 3D geometric model surface or object. In various applications (e.g., industrial, commercial, etc.), surface matching requires execution in real-time where the surface matching is precise for a known product (e.g., surface matching results should be consistent and reliable).

Current surface matchers utilize approaches that can be limiting, time-consuming, unreliable, and/or inefficient. For example, one approach executes surface matching between occurrences in a scene to those of a 3D model by randomly sampling a limited number of occurrence candidates which can yield inconsistent and unreliable results for applications (e.g., industrial, commercial, etc.) requiring precise results. Additionally, randomly sampling occurrence candidates requires an increase in a number of iterations for more than one occurrence in a scene which can impede surface matching processing (e.g., render the processing slower). As such, this approach can be time-consuming and unreliable.

In another example, another approach executes surface matching between occurrences in a scene to those of a 3D model for all possible occurrence candidates. This can impede surface matching processing (e.g., render the processing slower) without a gain in performance because false or low probability occurrence candidates are not pre-filtered and discarded. As such, this approach can be time-consuming and inefficient, and therefore unsuitable for real-time applications.

In yet another example, another approach determines occurrences in a scene to those of a 3D model where a 3D transformation between the 3D model and scene points is determined based on a predetermined number of sample points. However, this approach can render a transformation unstable and unreliable because the predetermined number of sample points is generally low, and the approach cannot evaluate a confidence level of the sample points. As such, this approach requires utilizing a refinement registration technique (e.g., iterative closest point (ICP)) to render the transformation stable and reliable which can impede surface matching processing (e.g., render the processing slower). As such, this approach can be time-consuming and unreliable, and therefore unsuitable for real-time applications.

In yet another example, another approach determines occurrences in a scene to those of a 3D model where a 3D transformation between the 3D model and scene points is determined based on utilizing a predetermined number of iterations of a refinement registration technique (e.g., ICP). However, this approach does not provide a mechanism (e.g., a metric or score) to determine a confidence level of a match between an occurrence and the 3D model to efficiently perform surface matching. Additionally, known metrics are unsuitable for surface matching applications. For example, the root mean square error (RMSE) metric does not provide a clear confidence level of a fit of a 3D model to a scene because the error is defined as a mean distance between points such that an amount of error depends on a scale of a point cloud. The RMSE metric also requires determining a closest distance between each point of a 3D model and a scene which can impede surface matching processing (e.g., render the processing slower) and render the RMSE metric unsuitable for real-time surface matching applications.

In view of the above-mentioned examples, current surface matchers utilize approaches that can be limiting, time-consuming, unreliable, and/or inefficient. As such, surface matchers may identify similar surfaces, or surfaces of larger objects, that are not actually matches for a given object or surface. Thus, after a surface is identified as a match, a user may be required to further verify that the object is an actual match which increases the overall time of the matching process. Due to the potentially high error rates of surface matching technologies, the use of surface matching can be limited to very specific applications and environments.

As such, there is a need for improved surface matching systems and methods having improved functionalities that provide for efficiently and reliably identifying surfaces and/or corresponding objects belonging thereto, in real time, among a plurality of various surfaces and objects. As described herein, the embodiments of the present disclosure may provide for more robust machine vision surface matching and object identification in real-time for various applications. By utilizing 3D geometric information and a multistage (e.g., two-stage) surface matching technique, the described systems and methods are capable of performing surface matching with increased efficiency and reduced error rates. Additionally, the multistage surface matching technique utilizes several mechanisms including, but not limited to, the filtering and grouping of occurrence candidates and metrics, to determine and improve a confidence level of a fit of a 3D model to a scene and to further distinguish between various products that have same or similar geometric surfaces and containers, as will be demonstrated, and illustrated in the figures and associated descriptions further herein. The disclosed embodiments may further provide benefits as to reduce human analysis and input during automated processes, increase surface matching efficiency, increase object identification efficiency and accuracy, and increase the versatility, machine vision process efficiency, and robustness of a machine vision system, and specifically, of a surface matching system.

FIG. 1 illustrates an example imaging system 100 configured to analyze an image of a target object to execute a machine vision job, and more specifically, a surface matching job in accordance with various embodiments disclosed herein. More specifically, the imaging system 100 is configured to detect and identify indicia in a plurality of orientations and arrangements in an image. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job, such as a surface matching job, for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs and/or various surface matching and object matching jobs, received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data, vector information, or other image data that may be analyzed by one or more tools each configured to perform an image analysis task. The digital camera and/or digital video camera of, e.g., the imaging assembly 126 may be configured, as disclosed herein, to take, capture, obtain, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a 3D camera (not shown) for capturing, sensing, or scanning 3D image data. The 3D camera may include an Infra-Red (IR) projector and a related IR camera for capturing, sensing, or scanning 3D image data/datasets. A 3D camera of the imaging assembly 126 may include one or more of a time-of-flight camera, a stereo vision camera, a structured light camera, a range camera, a 3D profile sensor, or a triangulation 3D imager. In any embodiments, the imaging assembly may include a camera capable of capturing color information of a field of view (FOV) of the camera. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data. In examples, a 3D image may include a point cloud or 3D point cloud. As such, as used herein, the terms 3D image and point cloud or 3D point cloud may be understood to be interchangeable.

In embodiments, the imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The ROI may be a predefined ROI, or the ROI may be determined through analysis of the image by the processor 118. Further, a plurality of ROIs may be predefined or determined through image processing. The composite area defined by the ROIs for all tools included in a particular job script may thereby define the predefined search space which the imaging assembly 126 may capture in order to facilitate the execution of the job script. However, the predefined search space may be user-specified to include a FOV featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data. Further, one or more ROIs may be within a FOV of the imaging system such that any region of the FOV of the imaging system may be a ROI.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, objects, surfaces, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
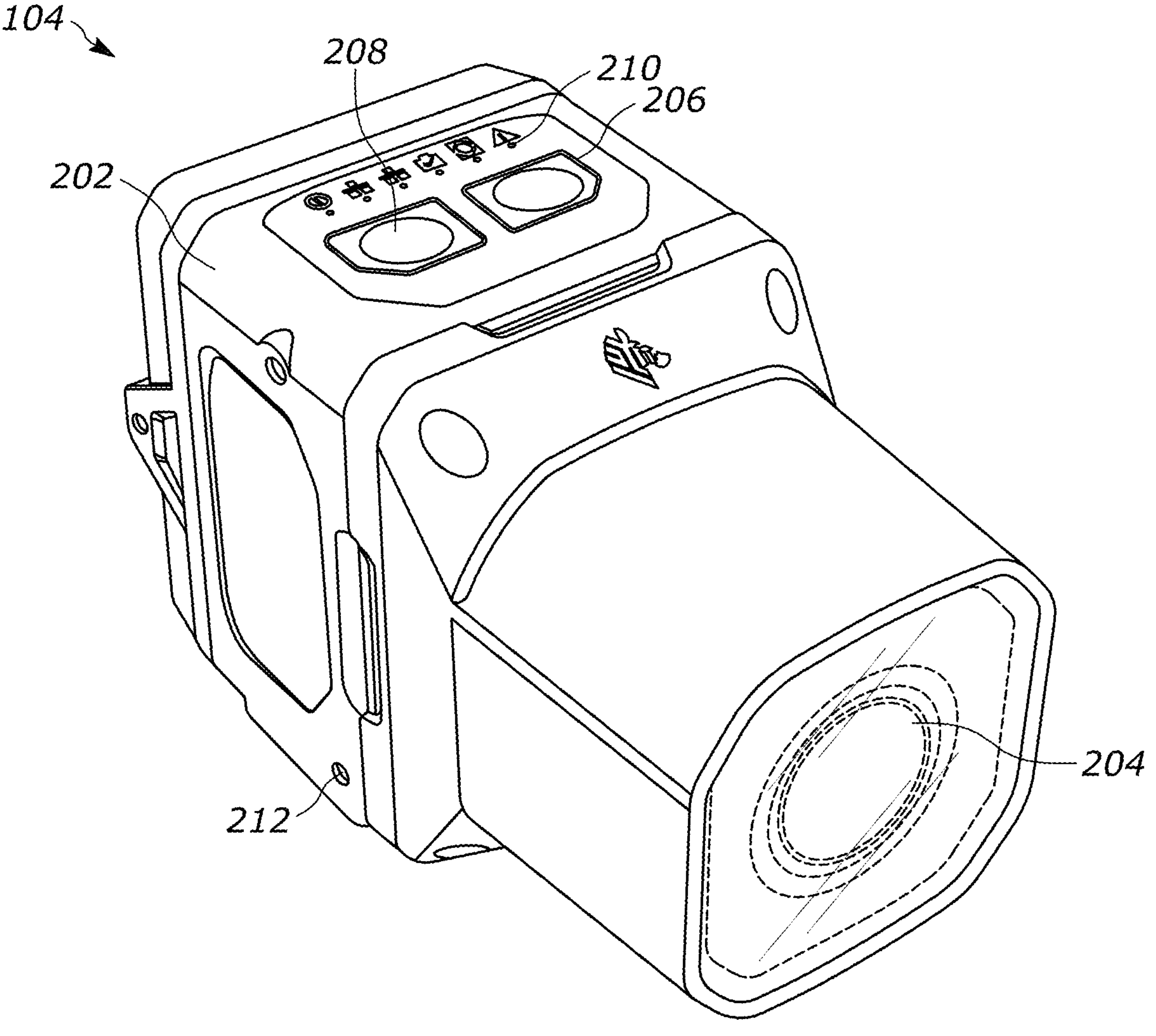
FIG. 2 is a perspective view of the imaging device of FIG. 1, in accordance with embodiments described herein.

FIG. 2 is a perspective view of an example imaging device 104 that may be implemented in the imaging system 100 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome switch/button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome switch/button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, scanning bed or table, structural support beam, etc.), other accessory items (e.g., a robotic arm), and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
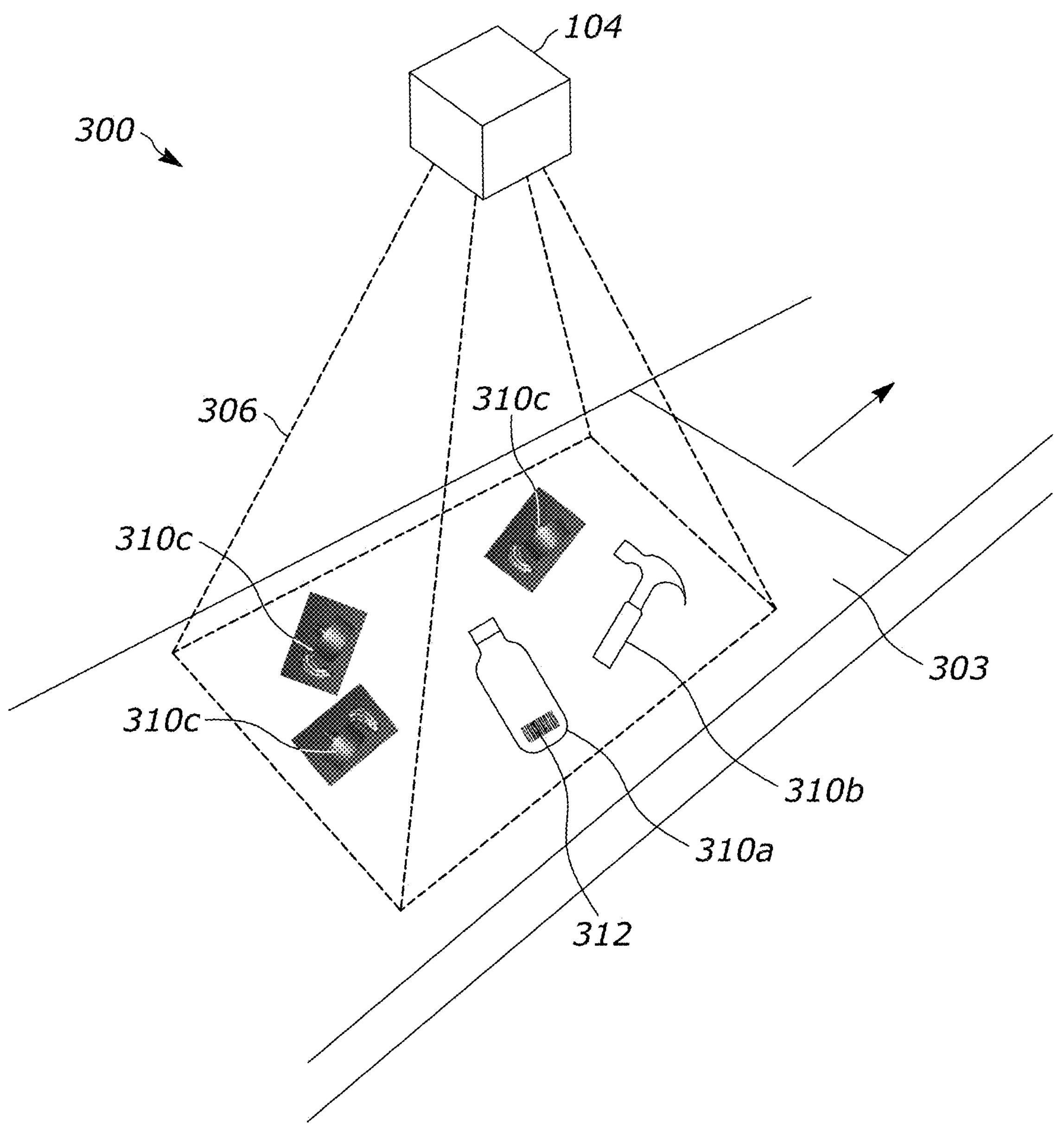
FIG. 3 illustrates an example environment for performing machine vision scanning, and surface matching, of an object, in accordance with embodiments described herein.

FIG. 3 illustrates an example environment 300 for performing machine vision scanning of an object as described herein. In the environment 300 of FIG. 3, the imaging device 104 of FIGS. 1 and 2 is positioned above a scanning surface 303. The imaging device 104 is disposed and oriented such that a FOV 306 of the imaging device 104 includes a portion of the scanning surface 303. The scanning surface may be a table, podium, mount for mounting an object or part, a conveyer, a cubby hole, or another mount or surface that may support a part or object to be scanned. As illustrated, the scanning surface 303 is a conveyer belt having a plurality of objects of interest 310*a*, 310*b*, and 310*c* thereon. The objects of interest 310*a*-310*c* are illustrated as being within the FOV 306 of the imaging device 104. The objects of interest 310*a*-310*c* may contain indicia 312 thereon. The imaging device 104 captures one or more images of the objects of interest 310*a*-310*c* and may determine a region of interest within the image that contains the objects of interest 310*a*-310*c*, or the ROI may be determined as a region of the image that contains the indicia 312. In examples, the objects of interest 310*a*-310*c* may have more than one indicia, and the imaging device 104 may capture an image of the FOV 306 and determine multiple ROIs in the captured image, each ROI having at least one indicia for decoding.

The imaging device 104 may determine one or more surfaces of each of the objects of interest 310*a*-310*c* for performing surface matching. The imaging device 104, and associated system 100, may identify, from 3D information from a 3D image or point cloud, a curved surface of one of the objects of interest 310*a*-310*c*. For example, the imaging device 104, and associated system 100, may identify a curved outer surface of a bottle (e.g., object of interest 310*a*), a curved surface of a handle of a hammer (e.g., object of interest 310*b*), or a curved surface of a widget (e.g., object of interest 310*c*). The imaging device 104, and associated processors and system 100, may then match the identified curved surface with a model surface to further perform surface matching.

The imaging device 104 may be mounted above the object of interest 310 on a ceiling, a beam, a metal tripod, or another object for supporting the position of the imaging device 104 for capturing images of the scanning surface 303. Further, the imaging device 104 may alternatively be mounted on a wall or another mount that faces objects on the scanning surface 303 from a horizontal direction. In examples, the imaging device 104 may be mounted on any apparatus or surface for imaging and scanning objects of interest that are in, or pass through, the FOV 306 of the imaging device 104.

As mentioned above, the embodiments of the present disclosure may provide for more robust machine vision surface matching and object identification in real-time for various applications. By utilizing 3D geometric information and a multistage surface matching technique, the described systems and methods are capable of performing surface matching with increased efficiency and reduced error rates. Additionally, the multistage surface matching technique utilizes several mechanisms including, but not limited to, the filtering and grouping of occurrence candidates and metrics, to determine and improve a confidence level of a fit of a 3D model to a scene and to further distinguish between various products that have same or similar geometric surfaces and containers, as will be demonstrated and illustrated in the figures and associated descriptions further herein. The disclosed embodiments may further provide benefits as to reduce human analysis and input during automated processes, increase surface matching efficiency, increase object identification efficiency and accuracy, and increase the versatility, machine vision process efficiency, and robustness of a machine vision system, and specifically, of a surface matching system.

Figure 4:
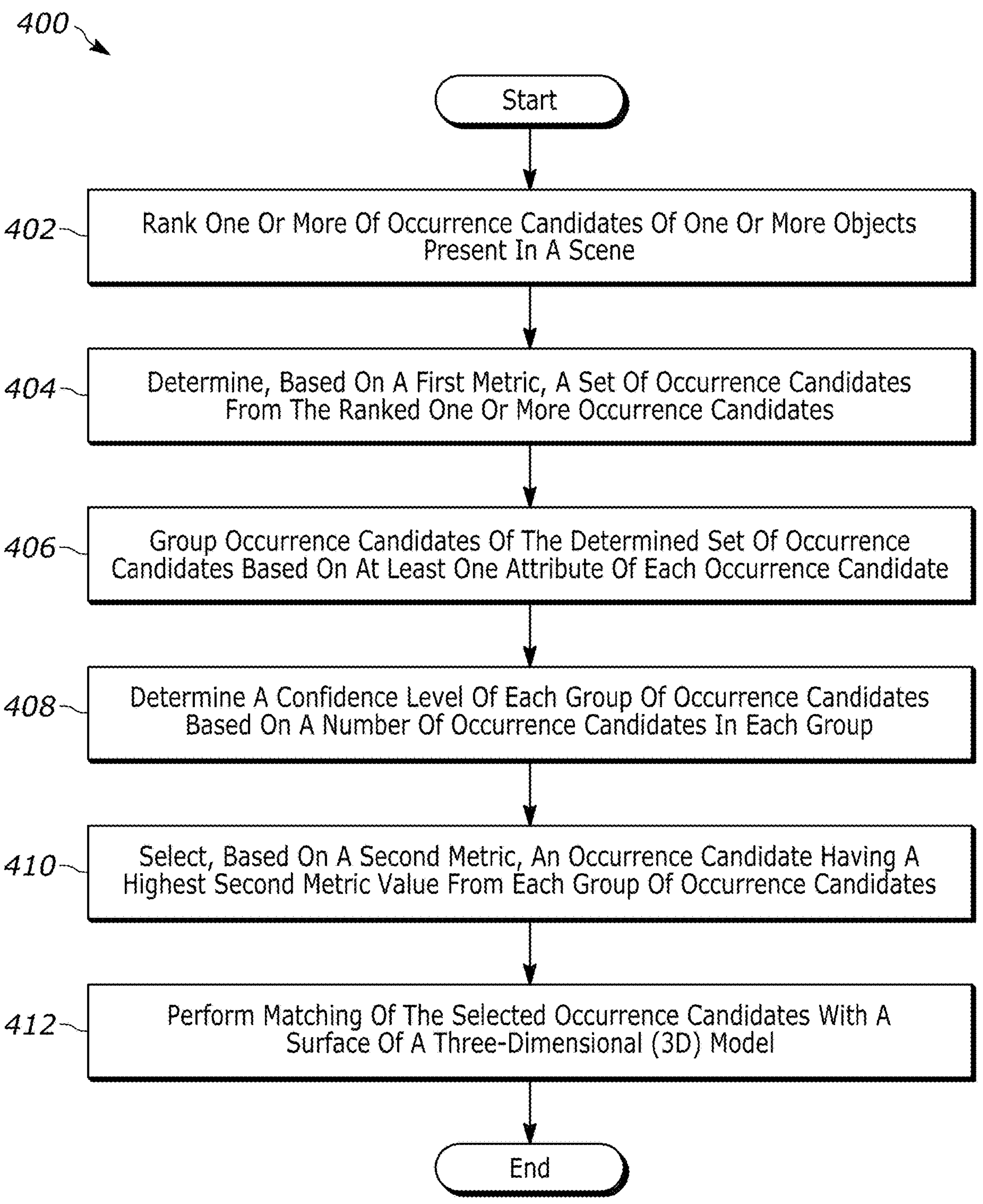
FIG. 4 is a flowchart illustrating processing steps carried out by an embodiment of the present disclosure.

Turning to the drawings, FIG. 4 is a flowchart 400 illustrating processing steps carried out by an embodiment of the present disclosure. In particular, FIG. 4 illustrates processing steps for multistage surface matching where steps 402-408 are indicative of a first stage and steps 410-412 are indicative of a second stage. The first stage provides for surface matching that can discard false or low probability occurrence candidates. The second stage provides for surface matching on promising or high probability occurrence candidates. As mentioned above, the system obtains, by a 3D camera, a 3D image of a field of view of the 3D camera where the 3D image includes one or more occurrence candidates of one or more objects present in a scene.

Figure 5:
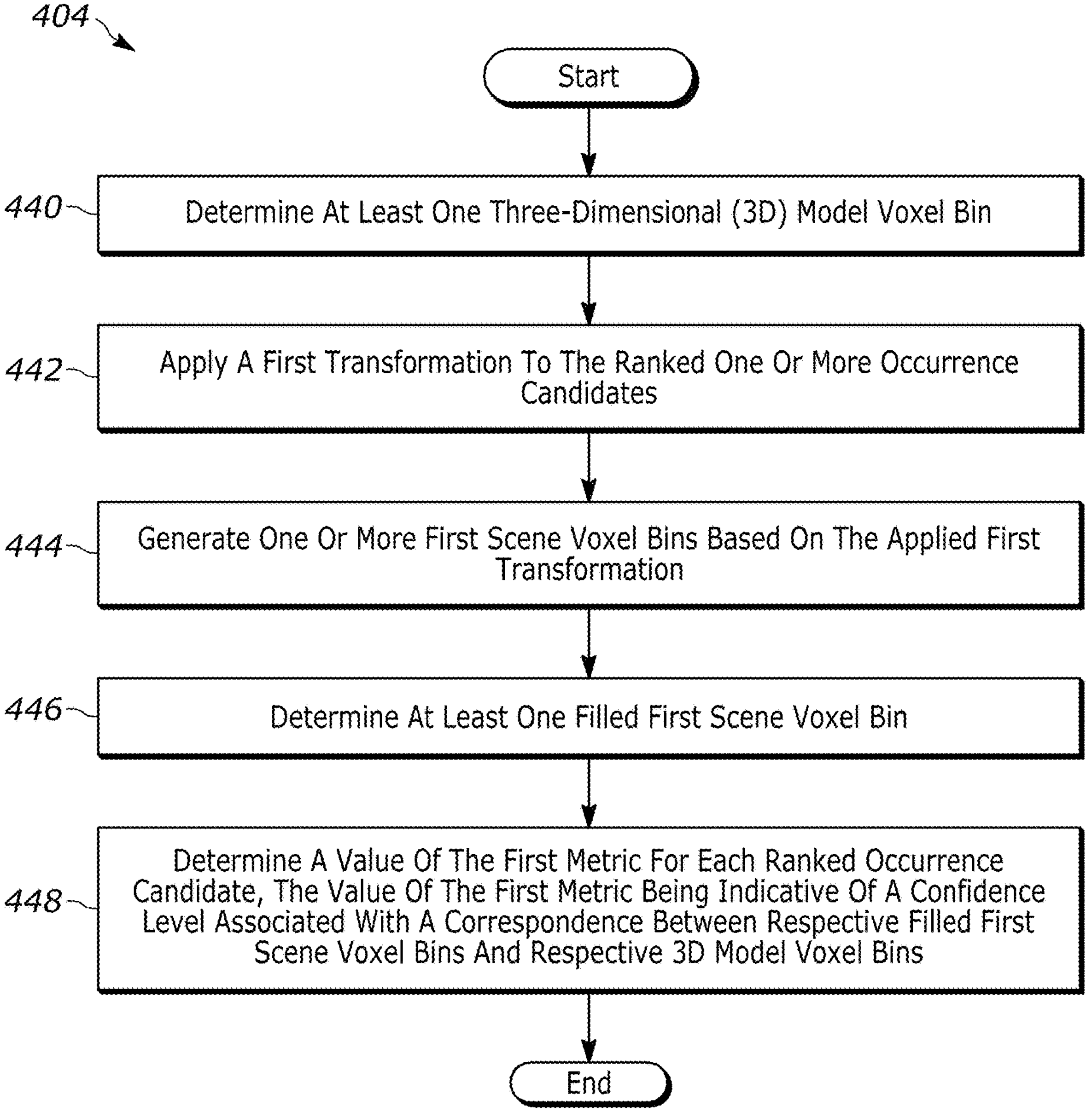
FIG. 5 is a flowchart illustrating step 404 of FIG. 4 in greater detail.

Beginning in step 402, the system ranks one or more occurrence candidates of one or more objects present in a scene. The occurrence candidates are 3D points indicative of a surface of the one or more objects present in the scene. In step 404, the system determines, based on a first metric, a set of occurrence candidates from the ranked one or more occurrence candidates. In this way, the system pre-filters occurrence candidates which provides for discarding false or low probability occurrence candidates and improving an efficiency and reliability of surface matching processing. FIG. 5 describes step 404 of FIG. 4 in greater detail below. Then, in step 406, the system groups occurrence candidates of the determined set of occurrence candidates based on at least one attribute of each occurrence candidate. For example, the system can group the occurrence candidates based on a centroid location of each occurrence candidate. In step 408, the system determines a confidence level of each group of occurrence candidates based on a number of occurrence candidates in each group. For example, the system can assign each group of occurrence candidates a confidence level (e.g., a measure) based on a number of occurrence candidates in the same group. In this way, the system provides for improving surface matching processing by efficiently determining a group with a high confidence level and terminating a search for such a group earlier on during surface matching processing.

Figure 7:
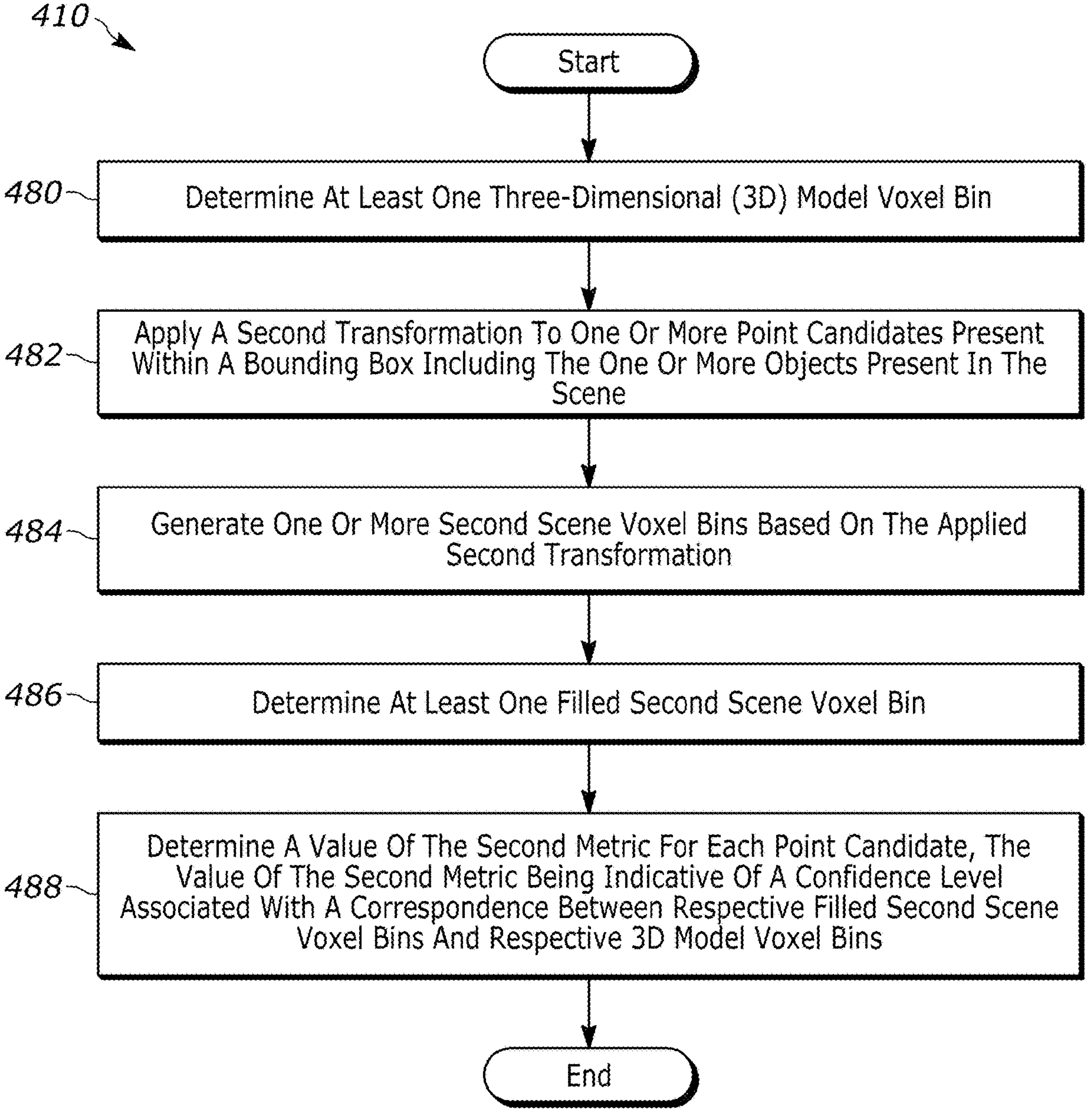
FIG. 7 is a flowchart illustrating step 410 of FIG. 4 in greater detail.

Then, in step 410, the system selects, based on a second metric, an occurrence candidate having a highest second metric value from each group of occurrence candidates. For example, to avoid duplicate occurrences in a same area, the system selects only one occurrence candidate having a highest second metric value where a value of the second metric is determined utilizing additional scene points. In this way, the system provides for surface matching processing on promising or high probability occurrence candidates to yield efficient and reliable results. FIG. 7 describes step 410 of FIG. 4 in greater detail below. In step 412, the system performs matching of the selected occurrence candidates with a surface of a 3D model.

Figure 6:
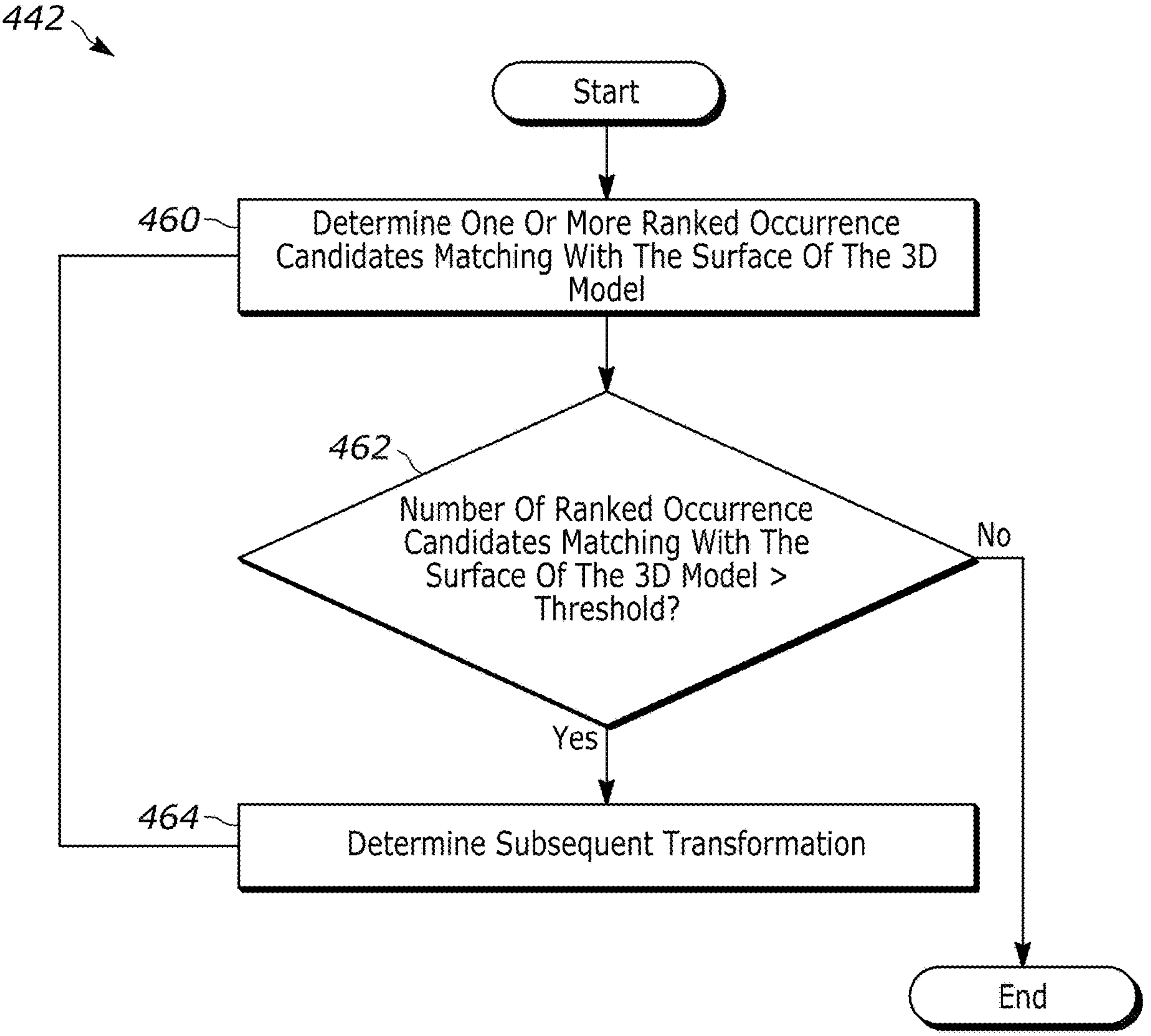
FIG. 6 is a flowchart illustrating step 442 of FIG. 5 in greater detail.

FIG. 5 is a flowchart illustrating step 404 of FIG. 4 in greater detail. Beginning in step 440, the system determines at least one 3D model voxel bin. For example, the system defines one or more 3D voxel bins of the 3D model. In step 442, the system applies a first transformation to the ranked one or more occurrence candidates. FIG. 6 describes step 442 of FIG. 5 in greater detail below. Then, in step 444, the system generates one or more first scene voxel bins based on the applied first transformation. As such, the system generates one or more first scene voxel bins corresponding to the ranked one or more occurrence candidates. In step 446, the system determines at least one filled first scene voxel bin. Then, in step 448, the system determines a value of the first metric for each ranked occurrence candidate. The value of the first metric is indicative of a confidence level associated with a correspondence between respective filled first scene voxel bins and respective 3D model voxel bins. For example, the system can determine a value of the first metric for each ranked occurrence candidate based on a binary intersection between respective filled first scene voxel bins and respective 3D model voxel bins. In this way, the system compares the respective filled first scene voxel bins and respective 3D model voxel bins as binary values (e.g., a point exists in a respective 3D model voxel bin (e.g., value=1) or a point does not exist in a respective 3D model voxel bin (e.g., value=0)).

FIG. 6 is a flowchart illustrating step 442 of FIG. 5 in greater detail. In step 460, the system determines one or more ranked occurrence candidates matching with the surface of the 3D model. For example, the system can determine one or more ranked occurrence candidates matching with the surface of the 3D model in feature space and Euclidean space. In step 462, the system determines whether a number of ranked occurrence candidates matching with the surface of the 3D model is greater than a threshold. For example, the system can determine as many points that can contribute to the first transformation between the scene and the 3D model. The threshold can be predetermined by the system or adjustable and set by a user. If the number of ranked occurrence candidates matching with the surface of the 3D model is greater than the threshold, then the process proceeds to step 464. Alternatively, if the number of ranked occurrence candidates matching with the surface of the 3D model is less than the threshold, then the process ends. In step 464, the system determines a subsequent transformation (e.g., a subsequent transformation to the first transformation and different from the first transformation). The system can apply the subsequent transformation (e.g., a second transformation) during a second stage of the surface matching processing as described in further detail below. The process can repeat until the number of ranked occurrence candidates matching with the surface of the 3D model is less than the threshold thereby causing the process to end. In this way, the system can improve surface matching processing by providing for a more stable and reliable transformation based on additional points without utilizing a refinement registration technique (e.g., ICP) that can impede the surface matching processing.

FIG. 7 is a flowchart illustrating step 410 of FIG. 4 in greater detail. Beginning in step 480, the system determines at least one 3D model voxel bin. For example, the system defines one or more 3D voxel bins of the 3D model. In step 482, the system applies a second transformation to one or more point candidates present within a bounding box including the one or more objects present in the scene. Then, in step 484, the system generates one or more second scene voxel bins based on the applied second transformation. As such, the system generates one or more second scene voxel bins corresponding to the one or more point candidates present within a bounding box including the one or more objects present in the scene. In step 486, the system determines at least one filled second scene voxel bin. Then, in step 488, the system determines a value of the second metric for each point candidate. The value of the second metric is indicative of a confidence level associated with a correspondence between respective filled second scene voxel bins and respective 3D model voxel bins. For example, the system can determine a value of the second metric for each candidate point by determining a histogram intersection between respective filled second scene voxel bins and respective 3D model voxel bins. In this way, the system intersects a distribution of points of the 3D model with a distribution of scene points in the same voxel grid structure.

Figure 8:
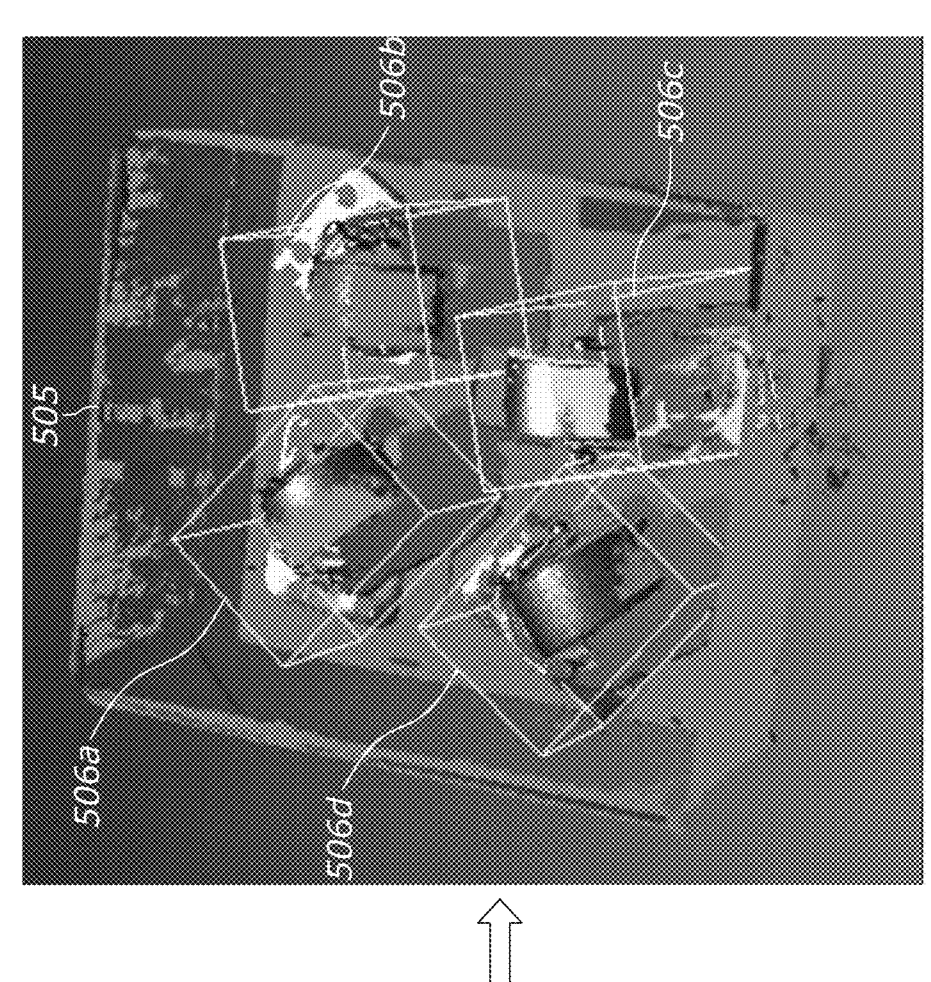
FIG. 8 is a diagram illustrating 3D surface matching carried out by an embodiment of the present disclosure.
Figure 8:
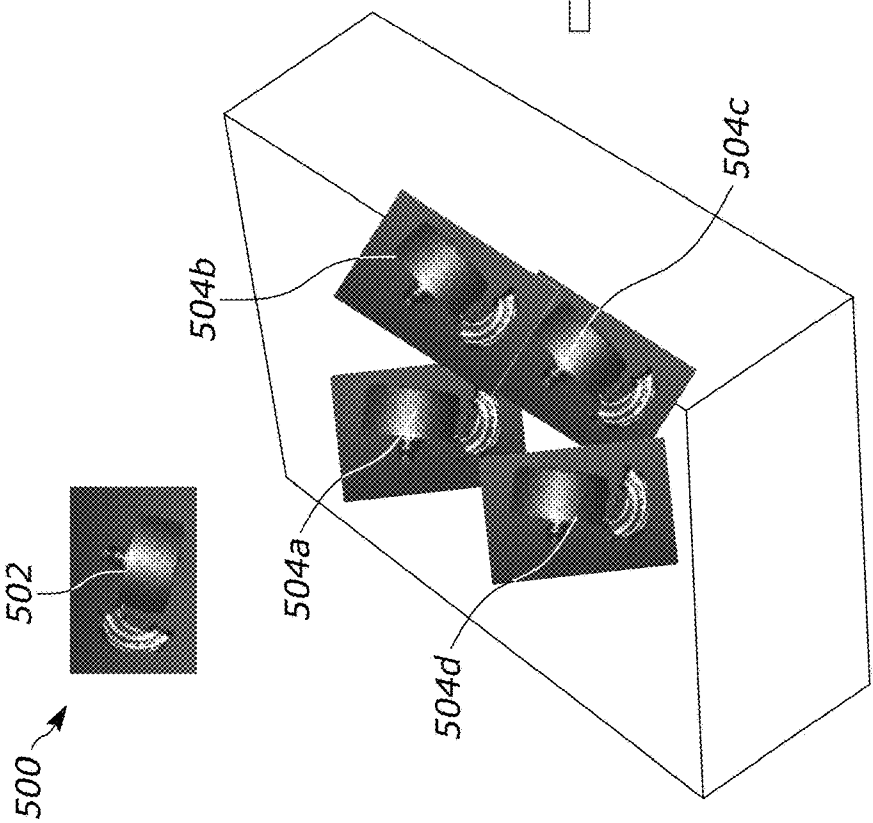

FIG. 8 is a diagram 500 illustrating 3D surface matching carried out by an embodiment of the present disclosure. As shown in FIG. 8, the system can perform surface matching between a 3D model 502 and widgets 504*a-d* to identify matches 506*a-d* in image 505 corresponding to the 3D model 502. Image 505 includes four matches 506*a-d* (as indicated by the cuboid frames), also referred to herein as matching surfaces or matching copies, to the model surface 502.

Figure 9A:
FIG. 9A is a diagram illustrating 3D surface matching carried out by an embodiment of the present disclosure.
Figure 9A:
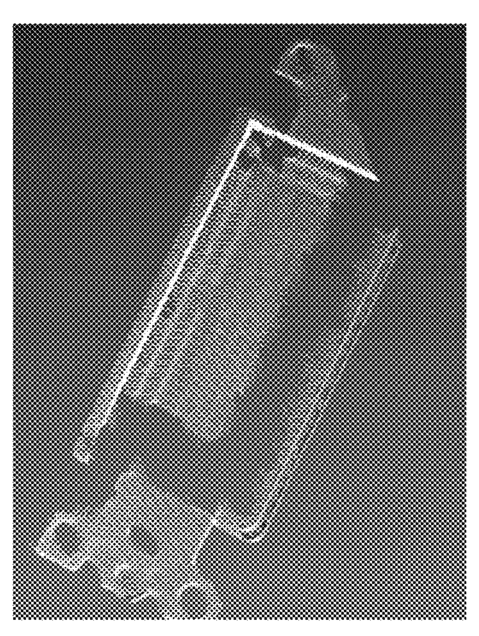
Figure 9A:
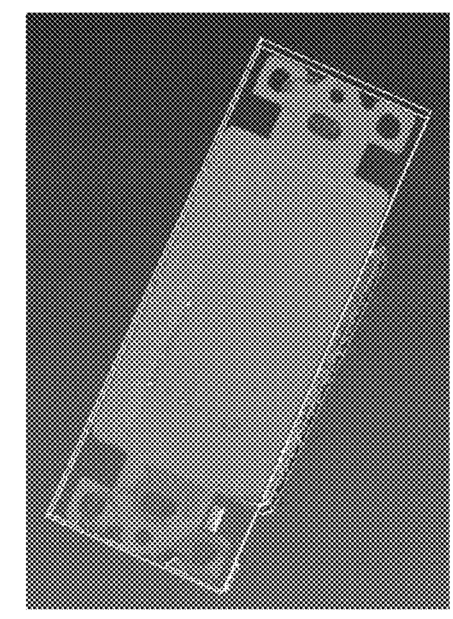
Figure 9B:
FIG. 9B is a diagram illustrating 3D surface matching carried out by a known approach.
Figure 9B:
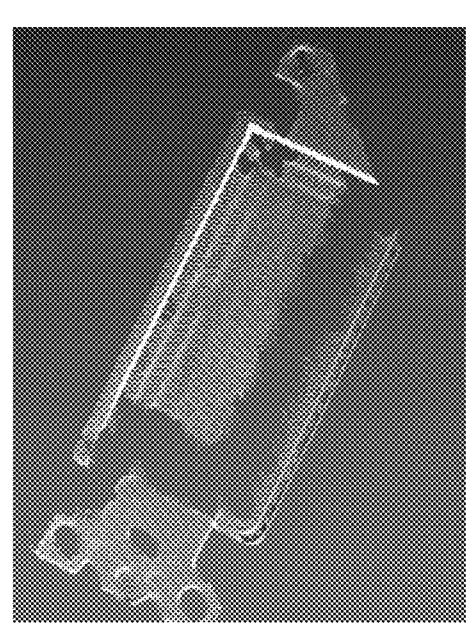
Figure 9B:
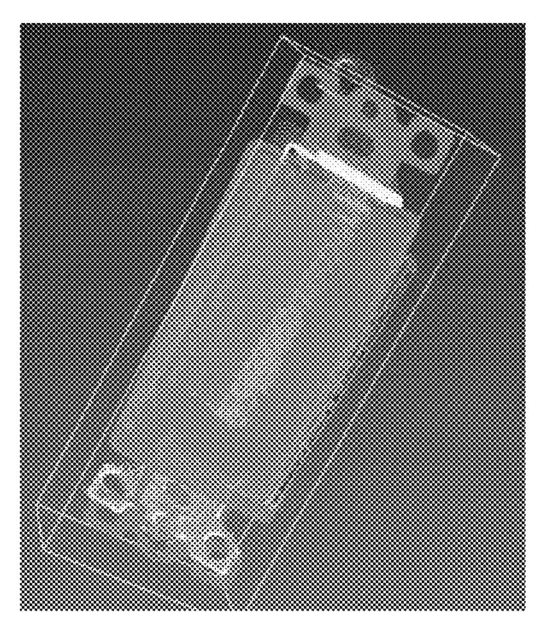

FIG. 9A is a diagram 600 illustrating 3D surface matching carried out by an embodiment of the present disclosure and FIG. 9B is a diagram 650 illustrating 3D surface matching carried out by a known approach. As shown in FIG. 9A, 3D surface matching utilizing the multistage surface matching technique of the present disclosure yields a transformation between a 3D model and a scene having an accuracy (e.g., score) of 96% in 0.13 seconds. Conversely, and as shown in FIG. 9B, 3D surface matching utilizing a known approach (e.g., single stage surface matching processing that randomly samples a limited number of occurrence candidates and utilizes an RMSE metric) yields a transformation between a 3D model and a scene having an accuracy (e.g., score) of 0.3 in 0.2 seconds. The results of FIGS. 8 and 9A-B show the increased accuracy of the methods and systems described herein. Using a multistage technique in performing 3D surface matching allows for reduced errors, more robust surface identification abilities, and further reduces or removes the need for user intervention in verifying accuracy of matched surfaces.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A method, comprising:
- obtaining, by a three-dimensional (3D) camera, a 3D image of a field of view of the 3D camera, the 3D image including one or more occurrence candidates of one or more objects present in a scene;
- ranking, via a processor, the one or more occurrence candidates;
- determining, via the processor and based on a first metric, a set of occurrence candidates from the ranked one or more occurrence candidates;
- grouping, via the processor, occurrence candidates of the determined set of occurrence candidates based on at least one attribute of each occurrence candidate;
- determining, via the processor, a confidence level of each group of occurrence candidates based on a number of occurrence candidates in each group;
- selecting, via the processor and based on a second metric, an occurrence candidate having a highest second metric value from each group of occurrence candidates; and
- performing, via the processor, matching of the selected occurrence candidates with a surface of a 3D model.

2. The method of claim 1, wherein the occurrence candidates are 3D points indicative of a surface of the one or more objects present in the scene.

3. The method of claim 1, wherein determining, via the processor and based on the first metric, the set of occurrence candidates from the ranked one or more occurrence candidates comprises:
- determining, via the processor, one or more 3D model voxel bins;
- applying, via the processor, a first transformation to the ranked one or more occurrence candidates;
- generating, via the processor, one or more first scene voxel bins based on the applied first transformation;
- determining, via the processor, one or more filled first scene voxel bins; and
- determining, via the processor, a value of the first metric for each ranked occurrence candidate, the value of the first metric being indicative of a confidence level associated with a correspondence between respective filled first scene voxel bins and respective 3D model voxel bins.

4. The method of claim 3, wherein applying, via the processor, the first transformation to the ranked one or more occurrence candidates comprises:
- determining, via the processor, one or more ranked occurrence candidates matching with the surface of the 3D model;
- determining, via the processor, whether a number of the ranked occurrence candidates matching with the surface of the 3D model is greater than a threshold; and
- determining, via the processor, a second transformation when the number of ranked occurrence candidates matching with the surface of the 3D model is greater than the threshold.

5. The method of claim 3, wherein applying, via the processor, the first transformation to the ranked one or more occurrence candidates comprises:
- determining, via the processor, whether a number of the ranked occurrence candidates matching with the surface of the 3D model is greater than a threshold; and
- generating, via the processor, the one or more first scene voxel bins based on the applied first transformation when the number of ranked occurrence candidates matching with the surface of the 3D model is less than the threshold.

6. The method of claim 3, wherein determining, via the processor, the value of the first metric indicative of the confidence level associated with the correspondence between the respective first scene voxel bins and the respective 3D model voxel bins comprises:
- determining, via the processor, a binary intersection between respective filled first scene voxel bins and respective 3D model voxel bins.

7. The method of claim 1, wherein the at least one attribute is a centroid location of each occurrence candidate.

8. The method of claim 1, wherein selecting, via the processor and based on the second metric, the occurrence candidate having a highest second metric value from each group of occurrence candidates comprises:
- determining, via the processor, one or more 3D model voxel bins;
- applying, via the processor, a second transformation to one or more point candidates present within a bounding box including the one or more objects present in the scene;
- generating, via the processor, one or more second scene voxel bins based on the applied second transformation;
- determining, via the processor, one or more filled second scene voxel bins; and
- determining, via the processor, a value of the second metric for each point candidate, the value of the second metric being indicative of a confidence level associated with a correspondence between respective filled second scene voxel bins and respective 3D model voxel bins.

9. The method of claim 8, wherein determining, via the processor, the value of the second metric indicative of the confidence level associated with the correspondence between the respective second scene voxel bins and the respective 3D model voxel bins comprises:
- determining a histogram intersection between respective filled second scene voxel bins and respective 3D model voxel bins.

10. A system comprising:
- a three-dimensional (3D) imager configured to capture and provide 3D images of a field of view of the 3D imager, the 3D images including one or more occurrence candidates of one or more objects present in a scene; and
- a processor and computer-readable media storage having machine readable instructions stored thereon that, when the machine readable instructions are executed, cause the system to:
  - obtain a first 3D image of the field of view of the 3D imager;
  - rank the one or more occurrence candidates;

determine, based on a first metric, a set of occurrence candidates from the ranked one or more occurrence candidates;

group occurrence candidates of the determined set of occurrence candidates based on at least one attribute of each occurrence candidate;

determine a confidence level of each group of occurrence candidates based on a number of occurrence candidates in each group;

select, based on a second metric, an occurrence candidate having a highest second metric value from each group of occurrence candidates; and perform matching of the selected occurrence candidates with a surface of a 3D model.

11. The system of claim 10, wherein the occurrence candidates are indicative of a surface of the one or more objects present in the scene.

12. The system of claim 10, wherein to determine, based on the first metric, the set of occurrence candidates from the ranked one or more occurrence candidates, the machine readable instructions further cause the system to:

determine one or more 3D model voxel bins;

apply a first transformation to the ranked one or more occurrence candidates;

generate one or more first scene voxel bins based on the applied first transformation;

determine one or more filled first scene voxel bins; and determine a value of the first metric for each ranked occurrence candidate, the value of the first metric being indicative of a confidence level associated with a correspondence between respective filled first scene voxel bins and respective 3D model voxel bins.

13. The system of claim 12, wherein to apply the first transformation to the ranked one or more occurrence candidates, the machine readable instructions further cause the system to:

determine one or more ranked occurrence candidates matching with the surface of the 3D model;

determine whether a number of the ranked occurrence candidates matching with the surface of the 3D model is greater than a threshold; and determine a second transformation when the number of ranked occurrence candidates matching with the surface of the 3D model is greater than the threshold.

14. The system of claim 12, wherein to apply the first transformation to the ranked one or more occurrence candidates, the machine readable instructions further cause the system to the machine readable instructions further cause the system to:

determine whether a number of the ranked occurrence candidates matching with the surface of the 3D model is greater than a threshold; and generate the one or more first scene voxel bins based on the applied first transformation when the number of ranked occurrence candidates matching with the surface of the 3D model is less than the threshold.

15. The system of claim 12, wherein to determine the value of the first metric indicative of the confidence level associated with the correspondence between the respective first scene voxel bins and the respective 3D model voxel bins, the machine readable instructions further cause the system to:

determine a binary intersection between respective filled first scene voxel bins and respective 3D model voxel bins.

16. The system of claim 10, wherein the at least one attribute is a centroid location of each occurrence candidate.

17. The system of claim 10, wherein to select, based on the second metric, the occurrence candidate having a highest second metric value from each group of occurrence candidates, the machine readable instructions further cause the system to:

determine one or more 3D model voxel bins;

apply a second transformation to one or more point candidates present within a bounding box including the one or more objects present in the scene;

generate one or more second scene voxel bins based on the applied second transformation;

determine one or more filled second scene voxel bins; and determine a value of the second metric for each point candidate, the value of the second metric being indicative of a confidence level associated with a correspondence between respective filled second scene voxel bins and respective 3D model voxel bins.

18. The system of claim 17, wherein to determine the value of the second metric indicative of the confidence level associated with the correspondence between the respective second scene voxel bins and the respective 3D model voxel bins, the machine readable instructions further cause the system to:

determine a histogram intersection between respective filled second scene voxel bins and respective 3D model voxel bins.

19. One or more tangible non-transitory computer-readable media storing computer-executable instructions that, when executed via one or more processors, cause one or more imaging systems to:

obtain, via a three-dimensional (3D) camera, a 3D image of a field of view of the 3D camera, the 3D image including one or more occurrence candidates of one or more objects present in a scene;

rank, via a processor, the one or more occurrence candidates;

determine, via the processor and based on a first metric, a set of occurrence candidates from the ranked one or more occurrence candidates;

group, via the processor, occurrence candidates of the determined set of occurrence candidates based on at least one attribute of each occurrence candidate;

determine, via the processor, a confidence level of each group of occurrence candidates based on a number of occurrence candidates in each group;

select, via the processor and based on a second metric, an occurrence candidate having a highest second metric value from each group of occurrence candidates; and perform, via the processor, matching of the selected occurrence candidates with a surface of a 3D model.

20. The one or more tangible non-transitory computer-readable media of claim 19, wherein to determine, via the processor and based on the first metric, the set of occurrence candidates from the ranked one or more occurrence candidates, the computer-executable instructions cause the one or more imaging systems to:

determine, via the processor, one or more 3D model voxel bins;

apply, via the processor, a first transformation to the ranked one or more occurrence candidates;

generate, via the processor, one or more first scene voxel bins based on the applied first transformation;

determine, via the processor, one or more filled first scene voxel bins; and determine, via the processor, a value of the first metric for each ranked occurrence candidate, the value of the first metric being indicative of a confidence level associated with a correspondence between respective filled first scene voxel bins and respective 3D model voxel bins.

21. The one or more tangible non-transitory computer-readable media of claim 20, wherein to apply the first transformation to the ranked one or more occurrence candidates, the computer-executable instructions cause the one or more imaging systems to:

determine, via the processor, one or more ranked occurrence candidates matching with the surface of the 3D model;

determine, via the processor, whether a number of the ranked occurrence candidates matching with the surface of the 3D model is greater than a threshold; and determine, via the processor, a second transformation when the number of ranked occurrence candidates matching with the surface of the 3D model is greater than the threshold.

22. The one or more tangible non-transitory computer-readable media of claim 19, wherein to select, based on the second metric, the occurrence candidate having the highest second metric value from each group of occurrence candidates, the computer-executable instructions cause the one or more imaging systems to:

determine, via the processor, one or more 3D model voxel bins;

apply, via the processor, a second transformation to one or more point candidates present within a bounding box including the one or more objects present in the scene;

generate, via the processor, one or more second scene voxel bins based on the applied second transformation;

determine, via the processor, one or more filled second scene voxel bins; and determine, via the processor, a value of the second metric for each point candidate, the value of the second metric being indicative of a confidence level associated with a correspondence between respective filled second scene voxel bins and respective 3D model voxel bins.

* * * * *